US009308773B2

(12) United States Patent
Steelman et al.

(10) Patent No.: US 9,308,773 B2
(45) Date of Patent: Apr. 12, 2016

(54) GRAPHIC ARTICLE

(75) Inventors: Ronald S. Steelman, Woodbury, MN (US); John A. Nielsen, Woodbury, MN (US); Keith R. Lyon, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/233,054

(22) PCT Filed: Jul. 30, 2012

(86) PCT No.: PCT/US2012/048773

§ 371 (c)(1), (2), (4) Date: Jan. 15, 2014

(87) PCT Pub. No.: WO2013/019699

PCT Pub. Date: Feb. 7, 2013

(65) Prior Publication Data

US 2014/0141214 A1 May 22, 2014

Related U.S. Application Data

(60) Provisional application No. 61/514,308, filed on Aug. 2, 2011.

(51) Int. Cl.

| | |
|---|---|
| ***B41M 5/52*** | (2006.01) |
| ***C08L 1/14*** | (2006.01) |
| ***B44C 1/00*** | (2006.01) |
| ***B44C 1/20*** | (2006.01) |
| ***B44C 3/02*** | (2006.01) |
| ***B05D 7/00*** | (2006.01) |
| ***B32B 33/00*** | (2006.01) |
| ***B32B 27/00*** | (2006.01) |
| ***B41M 1/30*** | (2006.01) |
| ***B41M 5/00*** | (2006.01) |
| *B32B 38/00* | (2006.01) |

(52) U.S. Cl.

CPC ... *B44C 1/00* (2013.01); *B05D 7/00* (2013.01); *B32B 27/00* (2013.01); *B32B 33/00* (2013.01); *B41M 1/30* (2013.01); *B41M 5/0047* (2013.01); *B41M 5/0052* (2013.01); *B41M 5/0064* (2013.01); *B41M 5/5281* (2013.01); *B44C 1/20* (2013.01); *B44C 3/02* (2013.01); *B32B 38/145* (2013.01); *B32B 2307/518* (2013.01); *B32B 2307/712* (2013.01); *B32B 2307/75* (2013.01); *Y10T 428/24802* (2015.01); *Y10T 428/24901* (2015.01)

(58) Field of Classification Search

CPC .... B41M 5/5236; B41M 5/5281; B41M 5/52; C08L 1/14

USPC ...................................................... 428/32.38

See application file for complete search history.

(56) References Cited

U.S. PATENT DOCUMENTS

| | | | |
|---|---|---|---|
| 2,359,419 A | 10/1944 | Heisenfeldt | |
| 2,736,721 A | 2/1956 | Dester | |
| RE24,906 E | 12/1960 | Ulrich | |
| 4,181,752 A | 1/1980 | Martens et al. | |
| 4,418,120 A | 11/1983 | Kealy et al. | |
| 4,833,179 A | 5/1989 | Young et al. | |
| 4,921,740 A | 5/1990 | Falconer et al. | |
| 4,968,562 A | 11/1990 | Delgado | |
| 4,994,322 A | 2/1991 | Delgado et al. | |
| 5,141,790 A | 8/1992 | Calhoun et al. | |
| 5,209,971 A | 5/1993 | Babu et al. | |
| 5,296,277 A | 3/1994 | Wilson et al. | |
| 5,362,516 A | 11/1994 | Wilson et al. | |
| 5,391,423 A | 2/1995 | Wnuk et al. | |
| 5,461,134 A | 10/1995 | Leir et al. | |
| 5,514,441 A | 5/1996 | Pohto et al. | |
| 5,837,375 A | 11/1998 | Brault et al. | |
| 6,054,208 A | 4/2000 | Rega et al. | |
| 6,218,321 B1 | 4/2001 | Lorcks et al. | |
| 6,309,734 B1 | 10/2001 | Taniguchi et al. | |
| 6,412,934 B1 * | 7/2002 | Moriyama ............. | B41J 2/2114 347/96 |
| 6,607,831 B2 | 8/2003 | Ho et al. | |
| 6,630,049 B2 | 10/2003 | Hannington | |
| 6,652,929 B2 | 11/2003 | Moriya et al. | |
| 6,703,115 B2 | 3/2004 | Hale et al. | |
| 6,737,154 B2 | 5/2004 | Jonza et al. | |
| 6,755,350 B2 | 6/2004 | Rochford et al. | |
| 6,830,803 B2 | 12/2004 | Vaidya et al. | |

(Continued)

FOREIGN PATENT DOCUMENTS

| | | |
|---|---|---|
| EP | 1609610 A1 | 12/2005 |
| JP | H06-8391 | 1/1994 |

(Continued)

OTHER PUBLICATIONS

PCT International Search Report from PCT/US2012/048773, dated Feb. 22, 2013, 3 pages.

Satas, Ed. D, "*Handbook of Pressure-Sensitive Adhesive Technology*", 2nd edition (1989).

Encyclopedia of Polymer Science and Engineering, vol. 13, 1964.

Supplementary European Search Report for Application No. EP12819321, dated Apr. 28, 2015.

*Primary Examiner* — Bruce H Hess

(74) *Attorney, Agent, or Firm* — Colene Blank; Sandra Nowak; Philip Dahl

(57) ABSTRACT

The present application is directed to articles useful as graphic films. Specifically, the present application is directed to an article comprising a film layer, the film layer comprising a polymer blend comprising a thermoplastic polyurethane and a cellulose ester, and an ink layer adjacent to at least one surface of the film. In some embodiments, the cellulose ester is a cellulose acetate butyrate. In some embodiments, the cellulose ester is a cellulose acetate propionate.

62 Claims, No Drawings

(56) References Cited

U.S. PATENT DOCUMENTS

| | | | |
|---|---|---|---|
| 7,042,641 | B2 | 5/2006 | Gettens |
| 7,661,806 | B2 * | 2/2010 | Missell et al. ................ 347/102 |
| 8,080,102 | B2 * | 12/2011 | Grant et al. ................ 106/31.78 |
| 8,101,200 | B2 | 1/2012 | Whitbourne et al. |
| 8,293,347 | B2 | 10/2012 | Kruger et al. |
| 8,349,437 | B2 | 1/2013 | Schneider |
| 8,455,099 | B2 | 6/2013 | Chevalier et al. |
| 8,491,968 | B2 | 7/2013 | Oki |
| 8,684,056 | B2 * | 4/2014 | Gila et al. ..................... 156/384 |
| 2002/0094444 | A1 | 7/2002 | Nakata et al. |
| 2007/0258141 | A1 | 11/2007 | Ohgaru et al. |
| 2009/0062473 | A1 | 3/2009 | Matsuda |
| 2009/0304971 | A1 | 12/2009 | Schneider |
| 2010/0028587 | A1 | 2/2010 | Grotefend |
| 2010/0297376 | A1 | 11/2010 | Shi et al. |
| 2011/0319529 | A1 | 12/2011 | Helmer et al. |
| 2011/0319530 | A1 | 12/2011 | Helmer et al. |
| 2011/0319531 | A1 | 12/2011 | Helmer et al. |
| 2011/0319532 | A1 | 12/2011 | Helmer et al. |
| 2013/0131221 | A1 | 5/2013 | Basu et al. |
| 2014/0154505 | A1 | 6/2014 | Steelman et al. |
| 2014/0158278 | A1 | 6/2014 | Steelman et al. |
| 2014/0162010 | A1 | 6/2014 | Steelman et al. |

FOREIGN PATENT DOCUMENTS

| | | |
|---|---|---|
| JP | 10-086313 | 4/1998 |
| JP | 2001-191697 | 7/2001 |
| JP | 2004-175972 | 6/2004 |
| JP | 2004175971 | 6/2004 |
| JP | 2004175972 | 6/2004 |
| JP | 2004-292696 | 10/2004 |
| JP | 2007-290389 | 11/2007 |
| JP | 2009-221425 | 1/2009 |
| KR | 2007-0113157 | 11/2007 |
| WO | WO 92/13924 | 8/1992 |
| WO | WO 93/12147 | 6/1993 |
| WO | WO 95/06564 | 3/1995 |
| WO | WO 95/13331 | 5/1995 |
| WO | WO 98/29516 | 7/1998 |
| WO | WO 00-66370 | 11/2000 |
| WO | WO 0123268 | 4/2001 |
| WO | WO 2006-052951 | 5/2006 |
| WO | WO 2007005808 | 1/2007 |
| WO | WO 2007-024802 | 3/2007 |
| WO | WO 2008/088633 | 7/2008 |
| WO | WO 2009/085662 | 7/2009 |
| WO | WO 2009/116469 | 9/2009 |
| WO | WO 2011/008226 | 1/2011 |

* cited by examiner

GRAPHIC ARTICLE

FIELD

This invention relates to film articles, their method of production and their use as graphic films.

BACKGROUND

Graphic films are used, for example, to apply designs, e.g. images, graphics, text and/or information, on windows, buildings, pavements or vehicles such as autos, vans, buses, trucks, streetcars and the like for e.g. advertising or decorative purposes. Many of the surfaces, e.g. vehicles, are irregular and/or uneven.

For graphic films, it is desirable to have a film that accommodates curves, depressions or projections on a substrate surface so that the film may be stretched around curves or projections, or may be pressed down into depressions without breaking or delaminating the film. This characteristic is generally referred to as conformability. It is also desirable that the film does not delaminate or release from the substrate surface after application (known as popping-up). Graphic films may also be imageable (i.e. able to receive printing and/or graphics) and exhibit good weathering for outdoor applications.

Polyvinyl chloride (PVC) films are conventionally used for a wide of variety of applications including graphic films. PVC has many properties that are advantageous for such applications and are easily printed using current printing technologies, e.g. piezo ink jet. For example, PVC graphic films are conformable to the varying topographies present on the exterior of a substrate, e.g. a vehicle. However, in some cases the application of halogen-containing plastics may be undesirable for environmental reasons.

Polyolefin films and their corresponding use as graphic films are advantageous in that they typically do not contain halogens. However, polyolefin films are difficult to image and thus may require the application of an additional image receptive layer, such as an ink receptive layer, toner receptive layer, primer layer or the like.

SUMMARY

The present application is directed to articles useful as graphic films. Specifically, the present application is directed to an article comprising a film layer, the film layer comprising a polymer blend comprising a thermoplastic polyurethane and a cellulose ester, and an ink layer adjacent to at least one surface of the film.

In some embodiments, the cellulose ester is a cellulose acetate butyrate. In some embodiments, the cellulose ester is a cellulose acetate propionate.

The film layer may additionally comprise polyester, a styrene copolymer (for example a styrene acrylonitrile copolymer), a plasticizer, a poly(meth)acrylate or all these materials. In some embodiments, the film layer is hot melt processable.

An ink receptive layer may be present on the surface of the film layer between the film layer and the ink layer.

In some embodiments, the ink layer is a piezo ink-jet ink, an ultraviolet curable ink, a solvent ink, or a latex ink.

The film layer may comprise a UV stabilizer or a pigment.

In some embodiments, the article has an adhesive layer adjacent the film layer opposite the ink layer. The adhesive layer may be a structured adhesive layer.

DESCRIPTION

Articles of the present invention comprise a film, and an ink layer on one major surface of the film.

The film according to the invention comprises a polymer blend. The blend comprises thermoplastic polyurethane and a cellulose ester. The cellulose ester may be, for example, cellulose acetate butyrate or a cellulose acetate propionate. Generally, the film is hot melt processable. Other materials may additionally be blended into the polymer blend. For example, a poly(meth)acrylate may be added to the polymer blend.

Thermoplastic polyurethane materials are blended with the cellulose ester. The thermoplastic polyurethane may be aliphatic or aromatic. Useful thermoplastic polyurethanes include, for example, those sold under the tradename ESTANE, for example ESTANE 58213, ESTANE 58277, ESTANE ALR CL87A TPU, and ESTANE ALR E60D TPU, from Lubrizol Advanced Materials, Inc., Cleveland, Ohio; KRYSTALGRAN PN3429-218 and KRYSTALGRAN PN03-217 from Huntsman Polyurethanes (an international business unit of Huntsman International LLC), The Woodlands, Tex.; and TEXIN 3044 and TEXIN 3075 from Bayer Corporation, Pittsburgh, Pa.

Blending of the polyurethane and cellulose ester materials is done by any method that results in a suitable mixture of the polymers. In some embodiments, the mixture is a multi-phase system. The polymers can be blended using several methods. In particular, the polymers can be blended by melt blending or solvent blending. Examples of melt blending include single screw extruding, twin screw extruding or an internal mixer (e.g. those sold under the tradename BANBURY.) In solvent blending, the polymers in the blend should be substantially soluble in the solvent used.

The thermoplastic polyurethane may be present in the blend in amounts greater than 10% by weight and in some embodiments greater than 40% by weight. In some embodiments, the thermoplastic urethane is present up to 60% by weight, and in some embodiments up to 90% by weight. The weight percentage of the thermoplastic polyurethane is based on total weight of the polyurethane and the cellulose ester. The blend ratio is generally determined by prioritization of the desired characteristics of the film. Specific examples of blends and their characteristics can be seen in the examples section herein.

Additives may be included in the blend to adjust properties of the resulting film comprising the blend. For example, the additive may modify print performance, enhance durability, modify environmental stability, adjust mechanical properties, change appearance or the like. Specific examples of additives include other polymers (e.g. polyesters, styrene copolymers such as styrene-acrylonitrile copolymers, poly(meth)acrylates, polyvinylchloride), monomeric or polymeric plasticizers, pigments, dyes, optical brighteners, fillers, ultraviolet light absorbers, ultraviolet stabilizers, antioxidants, flame retardants and the like. Each of these additives is used in an amount to produce the desired result.

Pigments may be used to modify the optical properties of the film such as color, opacity and to improve UV weathering resistance. Suitable pigments include, for example, titanium dioxide, carbon black, or any commercially available pigments. Typically pigments are generally used in amounts from 0.5 up to about 40% by weight of the total film weight. In some embodiments, the pigment is present in about 10-25% be weight of the film, for example when a white pigment is used.

Fillers may be used to extend the polymer blend or modify properties of the film, such as to improve tear properties, increase stiffness, improve fire resistance or reduce surface tack of the films. Examples of fillers include calcium carbonate, silicates, silico-aluminates, antimony trioxide, mica, graphite, talc and other similar mineral fillers, ceramic microspheres, glass or polymeric beads or bubbles, metal particles, fibers, starch and the like. Fillers are typically used in amounts of from 0.5 up to about 40% by weight of the total film weight, for example over 10% by weight.

The film may additionally comprise ultraviolet light absorbers, ultraviolet light stabilizers, heat stabilizers and/or antioxidants to further enhance protection against environmental aging caused by ultraviolet light or heat. Ultraviolet light (UV) absorbers include hydroxyphenylbenzotriazoles and hydroybenzophenones. UV stabilizers are commonly hindered amine light stabilizers (HALS). Antioxidants include, for example, hindered phenols, amines, and sulfur and phosphorus hydroxide decomposers. Typically such additives are used in amounts of about 0.1 up to about 5% by weight of the total film weight.

The film can be formed using any conventional method known to those skilled in the art. For example, the film can be formed using melt extrusion techniques. Extrusion is a known method of manufacturing films. Extrusion means, for the present application, the melt processing of molten streams. Coextrusion means that multiple streams are present simultaneously, and then combined into a single unified structure, or coextruded film. Examples of extrusion processes include single or multilayer extrusion using either cast extrusion or blown film extrusion.

The process is run generally by processing the feedstock at or above its melt temperature through the die, resulting in a film. A coextruded film is generally a composite of all the molten feedstocks placed within the co-extrusion process.

The films may, alternatively, be formed via coating using a solvent-based method. For example, the blend can be coated by such methods as knife coating, roll coating, gravure coating, rod coating, curtain coating and air knife coating. The coated solvent-based blend is then dried to remove the solvent, for example at elevated temperatures, such as those supplied by an oven, to expedite drying.

The film may further be processed, for example by orientation. One example of orientation of a film is biaxial orientation. Biaxial orientation involves stretching the film in two directions perpendicular to each other, generally in the down-web direction and cross-web direction. In a typical operation, the freshly extruded molten film is fed onto a chill roll to produce a quenched amorphous film which is briefly heated and stretched in the down-web direction, and then conducted through a tenter frame where it is stretched transversely with moderate heating. Down-web direction stretching may be accomplished by passing between two sets of nip rolls, the second set rotating at a higher speed than the first.

The film may be a multi-layer film construction. In such an embodiment, the layers of films may be different materials, or the same material with different additives, or the same material with different ratios of a blend. For example, a multilayer film construction may be made with a film layer comprising the polymer blend of the present application and a second film layer. The second film layer may comprise the polymer blend of the present application or a different polymer or blend, and may include a pigment in one of the film layers. Specifically, a film may comprise a clear layer over a white layer, or a white layer over a different pigment color. For the purpose of the present application, where the specification states "film", it encompasses single layer as well as multi-layer films.

In some embodiments, an adhesive layer is applied to one surface of the film. The adhesive layer may be activated by pressure, heat, solvent or any combination thereof and may be of a type based on a poly-α-olefin, a block copolymer, an acrylate, a natural or synthetic rubber resin or a silicone. When a pressure sensitive adhesive (PSA) layer is used, PSA's useful in the present invention can be self tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0004 to 0.008 g/cm$^2$). The application of the adhesive layer may also be achieved by laminating the film with an adhesive layer, optionally covered by a release liner. When a release liner is used, the adhesive is either coated on the liner and laminated to the film or coated on the film and the release liner subsequently applied to the adhesive layer. In some embodiments, the adhesive may be coextruded with the film and optionally the release liner. The adhesive layer may be applied as a continuous layer, or a patterned, discontinuous layer may have utility. The adhesive layer typically has a thickness of about 5 to about 50 micrometers.

Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,5165 (both Wilson et al) and U.S. Pat. No. 5,141,790 (Calhoun et al) and WO 96/1687 (Keller et al) and any other type of PSA disclosed in *Handbook of Pressure-Sensitive Adhesives*, Ed. D. Satas, 2$^{nd}$ Edition, Von Nostrand Reinhold, N.Y., 1989. Other examples of PSA's are described in U.S. Pat. No. Re 24,906 (Ulrich), U.S. Pat. No. 4,833,179 (Young et al), U.S. Pat. No. 5,209,971 (Babu et al), U.S. Pat. No. 2,736,721 (Dester), and U.S. Pat. No. 5,461,134 (Leir et al) and in the Encyclopedia of Polymer Science and Engineering, vol. 13, Wiley-Interscience Publishers, New York, 1988, and Encyclopedia of Polymer Science and Engineering, vol. 13, Wiley-Interscience Publishers, New York, 1964. Acrylate-based PSA's which are particularly useful in the present include those described in U.S. Pat. No. 4,181,752 (Clemens et al) and U.S. Pat. No. 4,418,120 (Kealy et al), WO 95/13331 and in *Handbook of Pressure-Sensitive Adhesives*, Ed. D. Satas, 2$^{nd}$ Edition.

In some embodiments, the adhesive layer is a repositionable adhesive layer. For the purposes of the present application, "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organo silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

In one embodiment, the article of the present application may be made by providing a film comprising a thermoplastic urethane and a cellulosic ester and applying an adhesive layer onto the first major surface of the film. In some embodiments, the adhesive layer is then covered with a release liner to form the film article. In another embodiment, an adhesive layer is covered with the optional release liner and then adhesive layer is applied onto the first major surface of the film to form the film article.

Because the film is imageable, i.e. can receive an ink layer, the films of the present application can be advantageously used as graphic films. An imaged graphic film comprising a thermoplastic urethane and a cellulosic ester, wherein the film is imaged is particularly useful in various graphic applications.

A method of providing a graphic film with a design, e.g. an imaged graphic film, comprises providing a film comprising a thermoplastic urethane and a cellulosic ester and providing an ink layer on at least one surface of the film. In some embodiments, the ink layer creates a design.

Imaging techniques suitable for imaging the film include ink jet printing, thermal mass transfer, flexography, dye sublimation, screen printing, electrostatic printing, offset printing, gravure printing or other printing processes. Useful inks include piezo ink-jet inks, thermal transfer inks, ultraviolet curable inks, solvent based inks and latex inks.

A top coat may also be employed as a functional layer. The top coat may be polymeric, and, for example, may be made of polyurethanes, polycarbonates or polyacrylics. A topcoat may be used to modify surface characteristic, but may also be used as a protective layer, for example over an image.

The film may also be treated with a conventional primer coating, and/or activated by flame or corona discharge, and/or by other surface treatment to enhance adhesion of a functional layer and/or the adhesive layer thereto.

Because the film exhibit excellent weathering properties, the films as well as imaged graphic films according to the invention are advantageously suitable for outdoor graphic applications. For example, an imaged graphic film adhered to a substrate is particular advantageous, wherein the imaged graphic film is exposed to an outdoor environment.

A method of providing a substrate with a graphic design comprises providing a film comprising a thermoplastic polyurethane and a cellulosic ester; providing an ink layer on at least one surface of the film, for example imaging a surface of film with a design to form an imaged graphic film, and applying the imaged graphic film to a surface of the substrate.

The imaged graphic film may be heated and then said film is adhered to the surface of the substrate, and in some embodiments the imaged graphic film is heated as said film is adhered to the surface of the substrate. The heated imaged graphic film can be easily conformed to the contours of the surface of the substrate by stretching the film around curves or projections and/or pressing the sheet material down into depressions. Generally, the heating may be performed at a temperature of up to about 80° C., for example at a temperature of about 40° C. to about 80° C. Because the imaged graphic films adhered to a substrate exhibit a low tendency towards popping up, the described methods and the adhered graphic films are especially desirable for substrates having an irregular, rough and/or uneven surface, for example a curved surface. In specific embodiments, the substrate is a vehicle, a window, a building, or pavement.

In certain situations, it can be advantageous to be able to easily remove a film from a substrate surface after application. In order to enhance removability, the films of the present invention may have a tensile at break of greater than the adhesion strength at removal temperature.

EXAMPLES

These examples are merely for illustrative purposes only and are not meant to be limiting on the scope of the appended claims. All parts, percentages, ratios, etc. in the examples and the rest of the specification are by weight, unless noted otherwise.

Materials

| | |
|---|---|
| PU 1 | KRYSTALGRAN PN3429-218, an aliphatic thermoplastic polyurethane based on polyester with a Shore A Durometer of 90, and having a tensile strength of 55.1 MPa (8000 psi), an ultimate elongation of 450%, a tensile modulus at 100% elongation of 5.5 MPa (800 psi), a thermal melt range of 90-130° C. (105-265° F.); available from Huntsman Polyurethanes (an international business unit of Huntsman International LLC), The Woodlands, Texas. |
| PU 2 | KRYSTALGRAN PN03-217, an aliphatic thermoplastic polyurethane based on polycaprolactone with a Shore A Durometer of 92, and having a tensile strength of 52 MPa (6500 psi), an ultimate elongation of 450%, a tensile modulus at 100% elongation of 7 MPa (1050 psi), and a softening range of 90-125° C. (194-257° F.); available from Huntsman Polyurethanes (an international business unit of Huntsman International LLC), The Woodlands, Texas. |
| PU 3 | ESTANE 58277, an aromatic polyester-based thermoplastic polyurethane with a Shore A Durometer of 92, and having a tensile strength of 62.1 MPa (9000 psi), an ultimate elongation of 450%, a tensile modulus at 100% elongation of 9.7 MPa (1400 psi), a Tm (DSC) of 130° C. (266° F.), and a Tg (DSC) of −20° C. (−4° F.); available from Lubrizol Advanced Materials, Inc., Cleveland, Ohio. |
| PU 4 | ESTANE 58213, an aromatic polyester-based thermoplastic polyurethane with a Shore A Durometer of 75, and having a tensile strength of 37.9 MPa (5500 psi), an ultimate elongation of 680%, a tensile modulus at 100% elongation of 2.8 MPa (400 psi), a Tm (DSC) of 110° C. (230° F.), and a Tg (DSC) of −30° C. (−22° F.); available from Lubrizol Advanced Materials, Inc., Cleveland, Ohio. |
| PU 5 | ESTANE ALR CL87A TPU, an aliphatic, polycaprolactone-based thermoplastic urethane (TPU) with a Shore A Durometer of 85-90, and having a tensile strength of 62.2 MPa (9015 psi), an ultimate elongation of 410%, and a tensile modulus at 100% elongation of 6.9 MPa (1000 psi); available from Lubrizol Advanced Materials, Inc., Cleveland, Ohio. |
| PU 6 | ESTANE ALR E60D TPU, a clear aliphatic thermoplastic polyurethane (TPU) with a Shore D Durometer of 60, and having a tensile strength of 57.2 MPa (8300 psi), an ultimate elongation of 360%, and a tensile modulus at 100% elongation of 15.2 MPa (2200 psi); available from Lubrizol Advanced Materials, Inc., Cleveland, Ohio. |
| PU 7 | TEXIN 3044, an aliphatic polyester-based thermoplastic polyurethane with a Shore A Durometer of 92, and having a tensile strength of 29.0 MPa (4200 psi), an ultimate elongation of 440%, a tensile modulus at 100% elongation of 8.3 MPa (1200 psi), a Vicat softening temperature of 39° C. (102° F.), and a Tg (DMA) of −20° C. (−4° F.); available from Bayer MaterialScience LLC, Pittsburgh, Pennsylvania. |
| PU 8 | TEXIN 3075 (developmental product TEXIN 825342), an aliphatic polyester-based thermoplastic polyurethane with a Shore D Durometer of 76, and having a tensile strength of 37.8 MPa (5482 psi), an ultimate elongation of 372%, and a tensile modulus at 100% elongation of 23.8 MPa (3447 psi); obtained from Bayer MaterialScience LLC, Pittsburgh, Pennsylvania. |
| CAB 1 | TENITE Butyrate 485E3720008 Clear, a cellulose acetate butyrate containing 8% bis(2-ethylhexyl) adipate plasticizer and having a tensile strength of 47.6 MPa (6900 psi), an ultimate elongation of 50%, a flexural modulus of 1586 MPa (2.30E5 psi), and a Vicat softening temperature of 109° C. (228° F.); available from Eastman Chemical Company, Kingsport, Tennessee. |
| CAB 2 | TENITE Butyrate 485E3720016 Clear, a cellulose acetate butyrate containing 16% bis(2-ethylhexyl) adipate plasticizer and having a tensile strength of 33.8 MPa (4900 psi), an ultimate elongation of 50%, a flexural modulus of 1103 MPa (1.60E5 psi), and a Vicat softening temperature of 96° C. (205° F.); available from Eastman Chemical Company, Kingsport, Tennessee. |
| CAB 3a | TENITE Butyrate 285E3720023 Clear, a cellulose acetate butyrate containing 23% bis(2-ethylhexyl) adipate plasticizer and having a tensile strength of 20.0 MPa (2900 psi), an ultimate elongation of 50%, a flexural modulus of 827 MPa (1.20E5 psi), and a Vicat softening temperature of 88° C. (190° F.); available from Eastman Chemical Company, Kingsport, Tennessee. |
| CAB 3b | TENITE Butyrate 485E3720023 Clear, a cellulose acetate butyrate containing 23% bis(2-ethylhexyl) adipate plasticizer and having a tensile strength of 20.0 MPa (2900 psi), an ultimate elongation of 50%, a flexural modulus of 827 MPa (1.20E5 psi), and a Vicat softening temperature of 88° C. (190° F.); available from Eastman Chemical Company, Kingsport, Tennessee. |
| CAB 4 | TENITE Butyrate 530E3720005 Clear, a cellulose acetate butyrate containing 5% bis(2-ethylhexyl) adipate plasticizer and having a tensile strength of 51.0 MPa (7400 psi), an ultimate elongation of 55%, a flexural modulus of 1724 MPa (2.50E5 psi), and a Vicat softening temperature of 115° C. (239° F.); available from Eastman Chemical Company, Kingsport, Tennessee. |
| CAB 5 | Tenite CAB Millbase 200AZ005610 - White Translucent Millbase, a white pigmented cellulose acetate butyrate containing 10% bis(2-ethylhexyl) adipate; available from Eastman Chemical Company, Kingsport, Tennessee |
| CAP 1 | TENITE Propionate 381A4000008 Clear, a cellulose acetate propionate containing 8% triethylene glycol bis(2-ethylhexanoate) and having a tensile strength of 42.7 MPa (6700 psi), an ultimate elongation of 50%, a flexural modulus of 1862 MPa (2.70 x 105 psi), and a Vicat softening temperature of 107° C. (225° F.); available from Eastman Chemical Company, Kingsport, Tennessee. |
| CAP 2 | TENITE Cellulose Propionate 300AZ021716 White Translucent Millbase, a white pigmented cellulose acetate propionate containing 16% bis(2-ethylhexyl) adipate; available from Eastman Chemical Company, Kingsport, Tennessee. |
| CAP 3 | Cellulose Acetate Propionate 482-20, a powder having the following characteristics: a melting point of 188-210 C., a glass transition temperature (Tg) of 147° C., an acetyl content of 1.3 wt %, a propionyl content of 48 wt %, and a hydroxyl content of 1.7 wt %; available from Eastman Chemical Company, Kingsport, Tennessee. |

-continued

| | |
|---|---|
| CAP 4 | TENITE Propionate 307A4000015 Clear Trsp, a cellulose acetate propionate containing 15% triethylene glycol bis(2-ethylhexanoate); available from Eastman Chemical Company, Kingsport, Tennessee. |
| CAP 5 | Cellulose Acetate Propionate EX000640-059-3 containing 15% triethylene glycol bis(2-ethylhexanoate) and 35% $TiO_2$; available from Eastman Chemical Company, Kingsport, Tennessee. |
| A1 | PARAPLEX A-8600 Polyester Adipate, a medium molecular weight polymeric ester; available from the HallStar Company, Chicago, Illinois. |
| A2 | ADMEX 770, a medium-to-high molecular weight polymeric plasticizer based on a blend of adipic and phthalic acid; available from Velsicol Chemical, LLC, Rosemont, Illinois. |
| A3 | SURLYN 1705-1, an ethylene/methacrylic acid zinc ionomer resin having a melting point (DSC) of 95° C. (203° F.), a Vicat softening point of 65° C. (149° F.); available from available from E. I. duPont de Nemours and Company, Inc., Wilmington, Delaware. |
| A4 | ELVAX 4260, a high molecular weight ethylene-vinyl acetate/acid terpolymer resin typically containing 28% by weight vinyl acetate and 15 by weight methacrylic acid, having a melting point (DSC) of 72° C. (162° F.); available from E. I. duPont de Nemours and Company, Inc., Wilmington, Delaware. |
| A5 | PP H110-02N, a polypropylene homopolymer having a melting point (DSC) of 161° C. (322° F.), a density of 0.9 g/cc; available from Dow Plastics, Midland, Michigan. |
| A6 | EASTMAN Copolyester 14285, a solid polyester polymer having a softening point of greater than 100° C. (212° F.); available from Eastman Chemical Company, Kingsport, Tennessee. |
| A7 | VITEL 2200B, a thermoplastic, high molecular, aromatic, linear saturated amorphous polymer exhibiting high tensile strength and low elongation, having a a glass transition temperature (Tg) (onset) of 63° C. (145° F.), and having a tensile strength of 66.2 MPa (9600 psi), an ultimate elongation of 7%, a molecular weight (weight average) of 47,500; available from BOSTIK, Middleton, Massachusetts. |
| A8 | LEVAMELT 800, a copolymer of ethylene and vinyl acetate having a vinyl acetate content of 80% by weight; available from LANXESS Corporation, Pittsburgh, Pennsylvania. |
| A9 | KURARAY LA 2250, a (meth)acrylic thermoplastic elastomer containing all triblock copolymer with approximately 31 weight % poly(methyl (meth)acrylate) an having a tensile strength of 9.0 MPa (1305 psi), an ultimate tensile elongation of 380% |
| A10 | STYROFLEX 2G66, a styrene-butadiene-styrene block copolymer having a Shore A hardness of 91, a tensile strength of 3.1 MPa (450 psi), a tensile modulus of 128 MPA (18,600 psi), and a Vicat softening temperature of 48° C. (118° F.); available from Styrolution, BASF Chemical Company, Florham Park, New Jersey. |
| 3545 C | 3M CONTROLTAC Removable Graphic Film with COMPLY Adhesive 3545C, a 0.10 mm (0.004 in.) thick, white, opaque polyolefin film having a matte finish and having on one side a 0.013 to 0.025 mm (0.0005 to 0.001 in.) thick, clear colored, slideable and positionable, pressure-activated adhesive with air release channels, available from 3M Company, St. Paul, Minnesota. |
| IJ 180-10 | 3M CONTROLTAC Graphic Film IJ 180-10, a white, opaque cast vinyl film having a thickness of 0.05 mm (0.002 in.); available from 3M Company, St. Paul, Minnesota. |
| IJ 380-10 | 3M CONTROLTAC Graphic Film IJ 380-10, a white, opaque cast vinyl film having a thickness of 0.05 mm (0.002 in.) and having superior conformability and lift resistance; available from 3M Company, St. Paul, Minnesota. |
| Clear PVC | SCOTCHCAL ELECTROCUT Graphic Film 7725-114, a 0.051 mm (0.002 inch) thick, cast clear vinyl film with a 0.063 to 0.09 mm (0.0025 to 0.0035 inch) thick clear pressure sensitive adhesive on one side, which is provided with a transparent synthetic liner over the adhesive, the liner being removed prior to application, available from 3M Company, St. Paul, Minnesota. |
| Base metal panel | An etched, desmutted, flashed anodized aluminum panel measuring 0.63 cm thick by 7.0 cm wide by 27.9 cm long (0.25 by 2.75 by 11 inches), obtained from Q-Panel Lab Products, Cleveland, Ohio. |
| Clear Polyester Film | An untreated, clear polyester film having a thickness of 0.061 mm (0.0024 inches). |
| 3640 GPS-114 | 3M SCOTCHCAL Gloss Overlaminate 3640GPS, a clear 25.4 micrometer (0.001 inch) thick poly(vinylidene fluoride) film having a gloss finish; available from 3M Company, St. Paul, Minnesota. |
| 8518 | 3M SCOTCHCAL Gloss Overlaminate 8518, a clear overlaminate having a gloss finish; available from 3M Company, St. Paul, Minnesota. |
| 8580 | 3M SCOTCHCAL Gloss Overlaminate 8580, a clear overlaminate having a gloss finish; available from 3M Company, St. Paul, Minnesota. |

Test Methods

Tensile Modulus (Young's), Ultimate Stress, and Ultimate Strain

Modulus (Young's), ultimate stress, and ultimate strain (elongation) were measured according to ASTM D882-10: "Standard Test Method for Tensile Properties of Thin Plastic Sheeting" using the following parameters. Three straight section specimens measuring 25.4 mm (1 inch) wide, 100 mm (4 inches) long, and having a thickness generally between approximately 45 and 65 micrometers were cut from film samples in the downweb direction and conditioned for a minimum of 15 minutes at 22+/−2° C. prior to testing. The separation distance between parallel rubber covered grips was 50.8 micrometers, the crosshead speed was 304.8 mm/minute (12 inches/minute), and the strain rate was 6 $min^{-1}$ The separation rate, force measurements, and data calculations were carried out by the system controller.

Printability

Printability was evaluated using an absolute print density test method according to ASTM D7305-08a: "Standard Test Method for Reflection Density of Printed Matter" and a Gretag SPM 50 LT spectrodensitometer having a 5 mm aperture on the measuring head. The spectral response was calibrated using a calibration plaque and found to be accurate to within 2%. A laminate of a 25 micrometer (0.001 inch) thick acrylic pressure sensitive adhesive layer on a white colored paper release liner was nip roll laminated at room temperature to an extruded film product prepared as described in "General Preparation of Films" below such that the surfaces of the adhesive and extruded film were joined together to give a film article. The white colored paper release liner had an optical density of between 0.06 and 0.10. The polyester carrier on the opposite side of the extruded film layer was removed and the white colored release liner side of the film article was attached by means of a spray adhesive to a graphic film carrier. The exposed surface of the film article was then printed with primary color bars covering at least 15 $cm^2$ using a platen temperature setting of 65° C. (150° F.) with a VUTEK UltraVu II Model 150 SC printer (obtained from VUTEK, a division of EFI Corporation, Meredith, N.H.) and air dried for a minimum of 24 hours prior to measuring the print density of the color bars.

Conformability

Conformability was evaluated using a tensile set test method according to ASTM D412-6a$^{e2}$: "Standard Test Methods for Vulcanized Rubber and Thermoplastic Elastomers—Tension" as follows. Test specimens having a width of 2.54 cm (1 inch) and a length of 10.2 cm (4 inches) were employed. The initial jaw separation distance on the film test specimen (50.8 mm) was marked, then the specimen was stretched at a rate of was 304.8 mm/minute (12 inches/minute) to 50% greater than its original length (76.2 mm) and held for 30 seconds. The test specimen was then released from the jaw grips and after 24 hours the length between the original marks was re-measured. Conformability, as measured by percent tensile set, was calculated as:

$$\%\ \text{Tensile Set} = [(L24 - L0)/(L1 - L0)] \times 100$$

where L24 is the measured length after 24 hours, L0 is the initial jaw separation distance, and L1 is the 50% extended length. A tensile set value of 100% corresponds to zero elastic recovery. A film having such a value will remain in a stretched position without contracting. A tensile set value of 0% corresponds to complete elastic recovery.

Durability

A laminate of a 25 micrometer (0.001 inch) thick acrylic pressure sensitive adhesive (isooctyl acrylate:acrylic acid/90:10 w/w) on a silicone coated release liner was joined to a clear extruded film product prepared as described in "General Preparation of Films" below at room temperature using a rubber roll laminator at 1.79 kg/linear cm (10 pounds/linear inch) such that the surfaces of the adhesive and extruded film were in contact to give a film article. After cutting a piece measuring 5.1 cm (2 inches) square, the release liner was removed and the film article was adhered to an aluminum panel painted with a catalyzed automotive type white enamel to give an aging sample. The polyester carrier was then removed from the film surface and the initial reflected optical density of the film was measured using a Gretag SPM 50 LT spectrodensitometer as used in the Printability test described above. Next, the aging sample was placed in an oven at 90° C. (194° C.). After seven days the sample were removed, the optical density measured again as before, and the change was recorded. An average of three measurements was reported.

General Preparation of Films

All films were extruded using a Type 2523 single screw extruder (C.W. Brabender, South Hackensack, N.J.) having a 1.90 cm (0.75 in.) diameter screw, a length of 61 cm (24 in.), and equipped with a Maddox element. The extruder was operated at a speed of 90 rpm, with a cooled feed throat, and the following, approximate zone and die temperatures: Z1: 182° C. (360° F.); Z2: 188° C. (370° F.); Z3: 193° C. (380° F.); Z4: 193° C. (380° F.); and die: 193° C. (380° F.). Zone temperatures were adjusted as needed, depending on the specific film formulations, to accommodate the melt viscosity of the input materials. Films were extruded through a 0.102 mm (0.004 inch) die gap onto a 15.2 cm (6 inch) wide polyester carrier film to provide a film product having a thickness of ca. 50 micrometers+/−15 micrometers (0.002 inches) and a width of between 10.2 and 15.2 cm (4 and 6 inches). The polyester carrier was removed from the film products prior to testing.

Films having the formulations shown in the tables below were prepared as described in "General Preparation of Films", then evaluated as described in the test methods above. The results are shown below.

TABLE 1

A: Formulations - Effect of Various Polyurethane, CAB, and CAP Resins

| Ex. | PU 1 | PU 2 | PU 5 | PU 8 | PU 7 | PU 6 | PU 4 | PU 3 | CAB 1 | CAB 3a | CAP 1 |
|---|---|---|---|---|---|---|---|---|---|---|---|
| 1 | 60 | | | | | | | | 40 | | |
| 2 | | 60 | | | | | | | 40 | | |
| 3 | | | 60 | | | | | | 40 | | |
| 4 | | | | 60 | | | | | 40 | | |
| 5 | | | | | 60 | | | | 40 | | |
| 6 | | | | | | 60 | | | 40 | | |
| 7 | | | | | | | 60 | | 40 | | |
| 8 | | | | | | | | 60 | 40 | | |
| 9 | 60 | | | | | | | | | 40 | |
| 10 | | 60 | | | | | | | | 40 | |
| 11 | | | 60 | | | | | | | 40* | |
| 12 | | | | 60 | | | | | | 40 | |
| 13 | 60 | | | | | | | | | | 40 |
| 14 | | | 60 | | | | | | | | 40 |

TABLE 1-continued

| | | | |
|---|---|---|---|
| 15 | 60 | | 40 |
| 16 | | 60 | 40 |

*Ex. 11 employed CAB 3b

B: Results - Effect of Various Polyurethane Resins, CAB, and CAP Resins

| Ex. | Thickness (micrometers) | Ultimate Strain (%) | Ultimate Stress (MPa) | Young's Modulus (MPa) | Print Density Cyan | Magenta | Yellow | Black | Total | Conformability (%) |
|---|---|---|---|---|---|---|---|---|---|---|
| 1 | 36.7 | 146 | 40.7 | 891.8 | 1.98 | 1.95 | 1.10 | 2.27 | 7.29 | 25 |
| 2 | 49.7 | 160 | 32.8 | 377.9 | 2.11 | 1.91 | 1.10 | 2.35 | 7.47 | 78 |
| 3 | 43.0 | 114 | 68.3 | 981.2 | 1.94 | 1.60 | 1.12 | 2.41 | 7.06 | 59 |
| 4 | 45.0 | 104 | 74.3 | 1679.1 | 2.16 | 1.95 | 1.08 | 2.16 | 7.34 | 63 |
| 5 | 45.0 | 189 | 42.5 | 407.5 | 1.29 | 1.15 | 0.98 | 1.22 | 4.64 | 62 |
| 6 | 44.0 | 94 | 52.5 | 1202.8 | 1.70 | 1.56 | 1.11 | 2.11 | 6.47 | 50 |
| 7 | 59.7 | 118 | 22.7 | 213.7 | 2.09 | 1.77 | 1.08 | 1.94 | 6.87 | 76 |
| 8 | 46.7 | 61 | 59.0 | 1024.2 | 1.92 | 1.73 | 1.08 | 2.05 | 6.78 | 14 |
| 9 | 52.3 | 210 | 47.9 | 59.9 | 2.12 | 2.05 | 1.14 | 2.29 | 7.58 | 5 |
| 10 | 41.0 | 147 | 68.6 | 1016.9 | 2.09 | 1.95 | 1.12 | 2.30 | 7.45 | 0 |
| 11 | 47.7 | 166 | 34.0 | 326.9 | 1.92 | 1.73 | 1.04 | 2.33 | 7.01 | 15 |
| 12 | 49.7 | 147 | 54.3 | 769.5 | 1.92 | 1.82 | 1.08 | 2.10 | 6.91 | 72 |
| 13 | 52.7 | 121 | 54.7 | 956.5 | 2.26 | 1.96 | 1.09 | 2.31 | 7.61 | 55 |
| 14 | 51.0 | 135 | 60.7 | 987.0 | 2.00 | 1.65 | 1.12 | 2.43 | 7.20 | 73 |
| 15 | 51.0 | 150 | 48.0 | 449.4 | 2.15 | 1.90 | 1.09 | 2.21 | 7.35 | 48 |
| 16 | 66.7 | 30 | 30.8 | 916.0 | 1.63 | 1.55 | 1.11 | 2.06 | 6.35 | * |

* Broke at less than 50% elongation.

TABLE 2

A: Formulations - Effect of Various PU:CAB and PU:CAP Ratios

| Ex. | PU 1 | CAB 3a | CAP 1 |
|---|---|---|---|
| 17 | 60 | 40 | 0 |
| 18 | 45 | 55 | 0 |
| 19 | 30 | 70 | 0 |
| 20 | 15 | 85 | 0 |
| 21 | 90 | 0 | 10 |
| 22 | 75 | 0 | 25 |
| 23 | 60 | 0 | 40 |
| 24 | 45 | 0 | 55 |
| 25 | 30 | 0 | 70 |
| 26 | 15 | 0 | 85 |

B: Results - Effect of Various PU:CAB and PU:CAP Ratios

| Ex. | Thickness (micrometers) | Ultimate Strain (%) | Ultimate Stress (MPa) | Young's Modulus (MPa) | Print Density Cyan | Magenta | Yellow | Black | Total | Conformability (%) |
|---|---|---|---|---|---|---|---|---|---|---|
| 17 | 52.3 | 210 | 47.9 | 59.9 | 2.12 | 2.05 | 1.14 | 2.29 | 7.58 | 5 |
| 18 | 50.3 | 145 | 45.3 | 413.8 | 2.20 | 2.09 | 1.16 | 2.36 | 7.80 | 24 |
| 19 | 49.7 | 121 | 37.5 | 572.5 | 2.21 | 2.08 | 1.15 | 2.30 | 7.74 | 80 |
| 20 | 46.7 | 119 | 34.7 | 794.9 | 2.17 | 1.99 | 1.10 | 2.30 | 7.55 | 81 |
| 21 | 58.0 | 261 | 47.6 | 280.8 | 2.02 | 1.69 | 1.22 | 2.23 | 7.17 | −1 |
| 22 | 55.5 | 390 | 50.2 | 17.1 | 2.12 | 1.68 | 1.06 | 2.26 | 7.12 | 7 |
| 23 | 52.7 | 121 | 54.7 | 956.5 | 2.26 | 1.96 | 1.09 | 2.31 | 7.61 | 55 |
| 24 | 45.3 | 84 | 66.8 | 1527.1 | 2.22 | 1.97 | 1.09 | 2.29 | 7.58 | 75 |
| 25 | 54.5 | 64 | 61.0 | 1796.2 | 2.20 | 1.97 | 1.10 | 2.29 | 7.56 | 68 |
| 26 | 53.3 | 7 | 45.7 | 1693.4 | 2.09 | 1.87 | 1.08 | 2.18 | 7.21 | * |

* Broke at less than 50% elongation.

TABLE 3

B: Results - Effect of Plasticizer Level

| Ex. | Thickness (micrometers) | Ultimate Strain (%) | Ultimate Stress (MPa) | Young's Modulus (MPa) | Print Density Cyan | Print Density Magenta | Print Density Yellow | Print Density Black | Print Density Total | Conformability (%) |
|---|---|---|---|---|---|---|---|---|---|---|
| 27 | 49.7 | 142 | 51.9 | 385.5 | 2.24 | 1.85 | 1.10 | 2.41 | 7.65 | 16 |
| 28 | 36.7 | 146 | 40.7 | 891.8 | 1.98 | 1.95 | 1.10 | 2.27 | 7.29 | 25 |
| 29 | 57.3 | 169 | 51.2 | 246.7 | 2.12 | 1.83 | 1.08 | 2.25 | 7.28 | 15 |
| 30 | 52.3 | 210 | 47.9 | 59.9 | 2.12 | 2.05 | 1.14 | 2.29 | 7.58 | 5 |

TABLE 4

A: Formulations - Effect of Polymeric Plasticizer

| Ex. | PU 1 | CAP 1 | CAP 3 | A1 | A2 |
|---|---|---|---|---|---|
| 31 | 55 | | 38.25 | 6.75 | |
| 32 | 55 | | 38.25 | | 6.75 |
| 33 | 55 | 45 | | | |

B: Results - Effect of Polymeric Plasticizer

| Ex. | Thickness (micrometers) | Ultimate Strain (%) | Ultimate Stress (MPa) | Young's Modulus (MPa) | Print Density Cyan | Print Density Magenta | Print Density Yellow | Print Density Black | Print Density Total | Conformability (%) |
|---|---|---|---|---|---|---|---|---|---|---|
| 31 | 53.0 | 144 | 53.6 | 762.1 | 2.29 | 2.03 | 1.11 | 2.42 | 7.85 | 46 |
| 32 | 51.3 | 139 | 57.9 | 1007.4 | 2.19 | 2.00 | 1.10 | 2.43 | 7.72 | 57 |
| 33 | 45.0 | 179 | 64.0 | 618.4 | 2.06 | 1.98 | 1.11 | 2.03 | 7.18 | 62 |

TABLE 5

A: Formulations - Effects of Various Additives

| Ex. | PU 1 | CAB 1 | CAB 5 | CAP 2 | A3 | A4 | A5 | A6 | A7 | A8 | A9 | A10 |
|---|---|---|---|---|---|---|---|---|---|---|---|---|
| 34 | 35 | 35 | | | 30 | | | | | | | |
| 35 | 52 | 43 | | | | | 5 | | | | | |
| 36 | 30 | | 60 | | | 10 | | | | | | |
| 37 | 60 | | 30 | | | | | 10 | | | | |
| 38 | 60 | | 30 | | | | | | 10 | | | |
| 39 | 30 | | | 45 | | | | | | 25 | | |
| 40 | 30 | | | 45 | | | | | | | 25 | |
| 41 | 30 | | | 45 | | | | | | | | 25 |

B: Results - Effects of Various Additives

| Ex. | Thickness (micrometers) | Ultimate Strain (%) | Ultimate Stress (MPa) | Young's Modulus (MPa) | Print Density Cyan | Print Density Magenta | Print Density Yellow | Print Density Black | Print Density Total | Conformability (%) |
|---|---|---|---|---|---|---|---|---|---|---|
| 34 | 51.3 | 81 | 44.0 | 781.8 | 2.01 | 1.69 | 1.09 | 2.25 | 7.04 | 43 |
| 35 | 77.0 | 21 | 13.5 | 445.7 | 1.711 | 1.765 | 1.096 | 1.805 | 6.377 | * |
| 36 | 52.7 | 100 | 29.4 | 711.5 | 1.67 | 1.73 | 0.98 | 1.66 | 6.04 | 33 |
| 37 | 54.0 | 193 | 36.9 | 512.2 | 1.87 | 1.34 | 1.00 | 2.03 | 6.23 | 35 |
| 38 | 56.7 | 198 | 35.1 | 353.0 | 1.99 | 1.72 | 1.02 | 2.00 | 6.72 | 27 |
| 39 | 55.0 | 190 | 34.8 | 737.8 | 1.80 | 1.78 | 1.01 | 1.78 | 6.37 | −3 |
| 40 | 52.7 | 188 | 28.1 | 589.2 | 1.98 | 1.97 | 1.03 | 1.85 | 6.83 | 49 |
| 41 | 51.3 | 81 | 44.0 | 781.8 | 1.71 | 1.64 | 0.98 | 1.77 | 6.10 | 50 |

ND: not determined/measured

* Broke at less than 50% elongation.

TABLE 6

| A: Formulations - Pigmented Films and Combinations | | | | | | |
|---|---|---|---|---|---|---|
| Ex. | PU 1 | CAB 1 | CAB 5 | CAP 1 | CAP 2 | CAP 4 |
| 42 | 38 | 14 | 48 | | | |
| 43 | 45.6 | 6.4 | 48 | | | |
| 44 | 50 | | | 10 | 40 | |
| 45 | 55 | | | | 45 | |
| 46 | 55 | | 45 | | | |
| 47 | 55 | | | | | 45 |

| B: Results - Pigmented Films | | | | | | | | | | |
|---|---|---|---|---|---|---|---|---|---|---|
| | Thickness | Ultimate | Ultimate Stress | Young's Modulus | Print Density | | | | | Conformability |
| Ex. | (micrometers) | Strain (%) | (MPa) | (MPa) | Cyan | Magenta | Yellow | Black | Total | (%) |
| 42 | 48.3 | 130 | 51.5 | 907.7 | 1.95 | 1.71 | 1.01 | 2.07 | 6.73 | 76 |
| 43 | 65.3 | 164 | 33.7 | 691.6 | 1.88 | 1.71 | 1.03 | 2.02 | 6.65 | 43 |
| 44 | 53.7 | 175 | 40.6 | 350.0 | 1.84 | 1.82 | 0.98 | 2.07 | 6.71 | 10 |
| 45 | 52.3 | 198 | 23.3 | 60.4 | 2.17 | 1.89 | 1.11 | 2.18 | 7.36 | 0 |
| 46 | 45.7 | 290 | 45.9 | 101.5 | 1.65 | 1.42 | .93 | 1.60 | 5.60 | 6 |
| 47 | 48.3 | 238 | 48.6 | 226.1 | 1.70 | 1.73 | 1.07 | 1.94 | 6.44 | 8 |

Samples 46 and 47 were converted to pressure sensitive films by laminating the adhesive used in commercially available IJ 180-10 to one surface of each of the films as previously described. Sample 47 was then adhered to the non-adhesive surface of sample 46 to form an example film laminate typical of a graphic arts film used for vehicle decoration. This laminate, a comparative sample of a commercially available film (IJ 180-10 overlaminated with 8518) and a second commercially available film (IJ 380-10 overlaminated with 8580) were applied to a 2010 Chevrolet HHR bumper using industry standard tools and techniques. The application of the example film laminate to the surface over the most complex contours of the bumper was comparable to an application using IJ380-10. After several hours, the applications with the example film laminate and IJ 380-10 were examined for lifting and both products showed no lifting or other failure. The application of IJ 180-10 showed some lifting.

TABLE 7

| A: Examples of Commercial Products | |
|---|---|
| Ex. | Description |
| 48 | IJ 180-10 |
| 49 | 3545C |
| 50 | IJ 380-10 |

| B: Results - Commercial Products | | | | | | | | | | |
|---|---|---|---|---|---|---|---|---|---|---|
| | Thickness | Ultimate | Ultimate Stress | Young's Modulus | Print Density | | | | | Conformability |
| Ex. | (micrometers) | Strain (%) | (MPa) | (MPa) | Cyan | Magenta | Yellow | Black | Total | (%) |
| 48 | 55.5 | 185 | 23.9 | 1075.6 | 2.36 | 2.08 | 1.12 | 2.59 | 8.14 | 33 |
| 49 | 104.6 | 683 | 20.9 | 263.6 | 1.59 | 1.39 | 0.97 | 1.61 | 5.57 | 19 |
| 50 | 51.6 | 202 | 23.4 | 1021.8 | 2.30 | 2.09 | 1.17 | 2.43 | 8.01 | 15 |

TABLE 8

| Results - Durability | | | | |
|---|---|---|---|---|
| Ex. | Description | Optical Density Initial | Optical Density Aged | Change |
| 51 | PU 1:CAB 3a/60:40 | 0.10 | 0.10 | 0.00 |
| 52 | PU 1:CAB 3a/45:55 | 0.11 | 0.11 | 0.00 |
| 53 | PU 1:CAB 3a/30:70 | 0.11 | 0.10 | −0.01 |
| 54 | PU 1:CAB 3a/15:85 | 0.11 | 0.10 | −0.01 |
| 55 | PU 1:CAP 1/90:10 | 0.12 | 0.12 | 0.00 |
| 56 | PU 1:CAP 1/75:25 | 0.12 | 0.12 | 0.00 |
| 57 | PU 1:CAP 1/60:40 | 0.11 | 0.11 | 0.00 |
| 58 | PU 1:CAP 1/45:55 | 0.11 | 0.11 | 0.00 |
| 59 | PU 1:CAP 1/30:70 | 0.11 | 0.10 | −0.01 |
| 60 | PU 1:CAP 1/15:85 | 0.11 | 0.10 | −0.01 |
| 61 | IJ 180-10 | 0.07 | 0.08 | 0.01 |
| 62 | Clear PVC | 0.11 | 0.18 | 0.07 |
| 63 | Base metal panel | 0.08 | 0.09 | 0.01 |
| 64 | Clear Polyester Film | 0.16 | 0.15 | −0.01 |
| 65 | 3640GPS-114 | 0.09 | 0.09 | 0.00 |

Example 66

Solvent Cast Film of the Invention

A coating solution was prepared by combining 80% (w/w) of N,N-Dimethyl Formamide, 11% (w/w) PU 1, and 9% (w/w) CAP 3 in a sealed container, placing the container on a roller for 16 hours at 25° C., then heating it at 65° for 4 hours, followed by another 24 hours at 25° C. on a roller. A viscous, hazy solution was obtained. This was coated onto a 96.5 micrometer (0.0038 inches) thick, untreated polyester film substrate using a 305 mm (12 inch) wide notch bar coater with a gap setting of 0.41 mm (0.016 inches). The coated polyester substrate was dried at 65° C. for 6 hours to provide a film of the invention, approximately 75 micrometers (0.003 inches) thick, on the polyester substrate. The film was carefully removed from the polyester substrate and evaluated for print density as described above. The results are shown in Table 9 below.

TABLE 9

| Results - Print Density | | | | | | |
|---|---|---|---|---|---|---|
| | Thickness | Print Density | | | | |
| Ex. | (micrometers) | Cyan | Magenta | Yellow | Black | Total |
| 66 | 75 | 1.673 | 1.556 | 1.042 | 1.797 | 6.068 |

Example 67

A multilayer film was prepared by coextruding the following layers:

1. a first layer of 1.0 mil of a blend of 55% by weight PU 1 and 45% by weight CAP 4.
2. a second layer of 0.2 mil maleated polyethylene (available under the tradename Amplify GR209 from Dow Chemical Co.),
3. a third layer of 2.55 mil of a mixture of 70% by weight low density polyethylene (Equistar Petrothene NA271009 available from LyondellBasell Corporation) and 30% by weight of PolyOne 15077 White CC00038580 White Pigment Masterbatch, available from PolyOne Corporation,
4. a fourth layer of 0.25 mils of ethylene-acrylic acid copolymer (available under the tradename Primacor 1410 from Dow Chemical Company).

Example 68

A second multilayer film was prepared by coextruding the following layers:

1. a first unpigmented layer of 0.24 mil of a blend of 55% by weight PU 1 and 45% by weight CAP4,
2. a second white pigmented layer of 1.76 mils of a blend of 55% by weight PU 1 and 45% by weight CAP 2.

Example 69

A second multilayer film was prepared by coextruding the following layers:

3. a first unpigmented layer of 0.4 mil of a blend of 55% by weight PU 1 and 45% by weight CAP4,
4. a second white pigmented layer of 1.6 mils of a blend of 55% by weight PU 1 and 45% by weight CAP 5.

The films in examples 67-69 were printed on the first layer and evaluated for print density as described above. The results are given below:

| | Print Density | | | | |
|---|---|---|---|---|---|
| Ex. | Cyan | Magenta | Yellow | Black | Total |
| 67 | 1.753 | 1.531 | 1.034 | 1.638 | 5.956 |
| 68 | 1.558 | 1.687 | 0.99 | 1.592 | 5.827 |
| 69 | 1.837 | 1.894 | 1.042 | 1.7 | 6.473 |

Samples 68 and 47 were converted to pressure sensitive films by laminating the adhesive used in commercially available IJ 180-10 to one surface of each of the films as previously described. Sample 47 was then adhered to the non-adhesive surface of sample 68 to form an example film laminate typical of a graphic arts film used for vehicle decoration. This laminate, a comparative sample of a commercially available film (IJ 180-10 overlaminated with 8518) and a second commercially available film (IJ 380-10 overlaminated with 8580) were applied to a 2010 Chevrolet HHR bumper using industry standard tools and techniques. The application of the example film laminate to the surface over the most complex contours of the bumper was comparable to an application using IJ380-10. After several hours, the applications with the example film laminate and IJ 380-10 were examined for lifting and both products showed no lifting or other failure. The application of IJ 180-10 showed some lifting.

Various modifications and alterations of the present invention will become apparent to those skilled in the art without departing from the spirit and scope of the invention.

What is claimed is:

1. An article comprising a film layer, the film layer comprising a polymer blend comprising a thermoplastic polyurethane and a cellulose ester, wherein the blend is not a multi-phase system; and an ink layer adjacent to at least one surface of the film;

wherein the film layer further comprises a polyester.

2. The article of claim 1 wherein the cellulose ester is a cellulose acetate butyrate.

3. The article of claim 1 wherein the cellulose ester is a cellulose acetate propionate.

4. The article of claim 1 wherein the film layer comprises a plasticizer.

5. The article of claim 1 wherein the film layer is made by a hot melt process.

6. The article of claim 1 comprising an ink receptive layer on the surface of the film layer between the film layer and the ink layer.

7. The article of claim 1 wherein the ink layer is a piezo ink jet ink.

8. The article of claim 1 wherein the ink layer is an ultraviolet curable ink.

9. The article of claim 1 wherein the ink layer is a solvent ink.

10. The article of claim 1 wherein the ink layer is a latex ink.

11. The article of claim 1 wherein the film layer comprises a UV stabilizer.

12. The article of claim 1 wherein the film layer comprises a pigment.

13. The article of claim 1 comprising an adhesive layer adjacent the film layer opposite the ink layer.

14. The article of claim 1 wherein the polymer blend comprises greater than 40% by weight of the thermoplastic polyurethane based on total weight of thermoplastic polyurethane and cellulose ester.

15. An article comprising a film layer, the film layer comprising a polymer blend comprising a thermoplastic polyurethane and a cellulose ester wherein the polymer blend comprises greater than 40% by weight of the thermoplastic polyurethane based on total weight of thermoplastic polyurethane and cellulose ester; and an ink layer adjacent to at least one surface of the film.

16. The article of claim 15 wherein the cellulose ester is a cellulose acetate butyrate.

17. The article of claim 15 wherein the cellulose ester is a cellulose acetate propionate.

18. The article of claim 15 wherein the film layer further comprises a polyester.

19. The article of claim 15 wherein the film layer further comprises a styrene copolymer.

20. The article of claim 19 wherein the styrene copolymer is a styrene acrylonitrile copolymer.

21. The article of claim 15 wherein the film layer comprises a plasticizer.

22. The article of claim 15 wherein the film layer further comprises a poly(meth)acrylate.

23. The article of claim 15 wherein the film layer is made by a hot melt process.

24. The article of claim 15 comprising an ink receptive layer on the surface of the film layer between the film layer and the ink layer.

25. The article of claim 15 wherein the ink layer is a piezo ink jet ink.

26. The article of claim 15 wherein the ink layer is an ultraviolet curable ink.

27. The article of claim 15 wherein the ink layer is a solvent ink.

28. The article of claim 15 wherein the ink layer is a latex ink.

29. The article of claim 15 wherein the film layer comprises a UV stabilizer.

30. The article of claim 15 wherein the film layer comprises a pigment.

31. The article of claim 15 comprising an adhesive layer adjacent the film layer opposite the ink layer.

32. The article of claim 15 wherein the blend is not a multi-phase system.

33. An article comprising a film layer, the film layer comprising a polymer blend comprising a thermoplastic polyurethane and a cellulose ester, wherein the blend is not a multi-phase system; and an ink layer adjacent to at least one surface of the film;

wherein the film layer further comprises a styrene copolymer.

34. The article of claim 33 wherein the cellulose ester is a cellulose acetate butyrate.

35. The article of claim 33 wherein the cellulose ester is a cellulose acetate propionate.

36. The article of claim 33 wherein the styrene copolymer is a styrene acrylonitrile copolymer.

37. The article of claim 33 wherein the film layer comprises a plasticizer.

38. The article of claim 33 wherein the film layer further comprises a poly(meth)acrylate.

39. The article of claim 33 wherein the film layer is made by a hot melt process.

40. The article of claim 33 comprising an ink receptive layer on the surface of the film layer between the film layer and the ink layer.

41. The article of claim 33 wherein the ink layer is a piezo ink-jet ink.

42. The article of claim 33 wherein the ink layer is an ultraviolet curable ink.

43. The article of claim 33 wherein the ink layer is a solvent ink.

44. The article of claim 33 wherein the ink layer is a latex ink.

45. The article of claim 33 wherein the film layer comprises a UV stabilizer.

46. The article of claim 33 wherein the film layer comprises a pigment.

47. The article of claim 33 comprising an adhesive layer adjacent the film layer opposite the ink layer.

48. The article of claim 33 wherein the polymer blend comprises greater than 40% by weight of the thermoplastic polyurethane based on total weight of thermoplastic polyurethane and cellulose ester.

49. An article comprising a film layer, the film layer comprising a polymer blend comprising a thermoplastic polyurethane and a cellulose ester, wherein the blend is not a multi-phase system; and an ink layer adjacent to at least one surface of the film;

wherein the film layer further comprises a poly(meth)acrylate.

50. The article of claim 49 wherein the cellulose ester is a cellulose acetate butyrate.

51. The article of claim 49 wherein the cellulose ester is a cellulose acetate propionate.

52. The article of claim 49 wherein the film layer comprises a plasticizer.

53. The article of claim 49 wherein the film layer is made by a hot melt process.

54. The article of claim 49 comprising an ink receptive layer on the surface of the film layer between the film layer and the ink layer.

55. The article of claim 49 wherein the ink layer is a piezo ink-jet ink.

56. The article of claim 49 wherein the ink layer is an ultraviolet curable ink.

57. The article of claim 49 wherein the ink layer is a solvent ink.

58. The article of claim 49 wherein the ink layer is a latex ink.

59. The article of claim 49 wherein the film layer comprises a UV stabilizer.

60. The article of claim 49 wherein the film layer comprises a pigment.

61. The article of claim 49 comprising an adhesive layer adjacent the film layer opposite the ink layer.

62. The article of claim 49 wherein the polymer blend comprises greater than 40% by weight of the thermoplastic polyurethane based on total weight of thermoplastic polyurethane and cellulose ester.

* * * * *